(12) United States Patent
Reynolds

(10) Patent No.: US 9,469,286 B2
(45) Date of Patent: Oct. 18, 2016

(54) AUTOMATIC FLOW CALIBRATION FOR LOCOMOTIVE AIR BRAKE SYSTEM

(71) Applicant: NEW YORK AIR BRAKE, LLC, Watertown, NY (US)

(72) Inventor: John M Reynolds, Carthage, NY (US)

(73) Assignee: New York Air Brake, LLC, Watertown, NY (US)

( * ) Notice: Subject to any disclaimer, the term of this patent is extended or adjusted under 35 U.S.C. 154(b) by 4 days.

(21) Appl. No.: 14/613,768

(22) Filed: Feb. 4, 2015

(65) Prior Publication Data
US 2016/0221563 A1  Aug. 4, 2016

(51) Int. Cl.
*B60T 8/00* (2006.01)
*B60T 15/02* (2006.01)
*B60T 8/17* (2006.01)

(52) U.S. Cl.
CPC ............ *B60T 15/027* (2013.01); *B60T 8/1705* (2013.01)

(58) Field of Classification Search
CPC ........ B60T 15/27; B60T 15/28; B60T 15/21; B60T 8/1705
See application file for complete search history.

(56) References Cited

U.S. PATENT DOCUMENTS

| | | | |
|---|---|---|---|
| 5,501,512 A | 3/1996 | Hart | |
| 5,564,794 A * | 10/1996 | Hart | B60T 15/42 303/15 |
| 5,579,807 A * | 12/1996 | Kohler | B60T 8/1893 137/625.65 |
| 5,808,909 A | 9/1998 | Rees | |
| 7,054,777 B2 * | 5/2006 | Crane | B60T 17/228 702/114 |
| 2003/0066360 A1* | 4/2003 | Kettle, Jr. | B60T 13/683 73/861.52 |
| 2005/0275279 A1* | 12/2005 | Ring | B60T 8/1893 303/9.69 |
| 2009/0309413 A1* | 12/2009 | Bensch | B60T 8/362 303/20 |
| 2013/0062933 A1* | 3/2013 | Daher | B60T 7/042 303/10 |

OTHER PUBLICATIONS

International Search Report Form PCT/ISA/220, International Application No. PCT/US2015/014415, pp. 1-10, Dated Oct. 9, 2015.

* cited by examiner

*Primary Examiner* — Truc M Do
(74) *Attorney, Agent, or Firm* — Bond Schoeneck and King PLLC; David Nocilly

(57) ABSTRACT

A system and method for automatically calibrating the flow measurement device of a locomotive air brake control system. The air brake control computer controls activates a magnet valve to create a predetermined flow from the brake pipe through an orifice to exhaust, thereby creating a reference flow value to enable the calibration of the flow measurement device. The system reduces the likelihood of human error and variability by automating the steps necessary for flow measurement calibration under computer control.

15 Claims, 2 Drawing Sheets

AUTOMATIC FLOW CALIBRATION FOR LOCOMOTIVE AIR BRAKE SYSTEM

BACKGROUND OF THE INVENTION

1. Field of the Invention

The present invention relates to locomotive braking systems and, more particularly, to a system and method for calibrating the measurement of compressed air flow from the supply (main) reservoir to the brake pipe.

2. Description of the Related Art

Locomotive air brake systems control train brakes by modulating the pressure in a compressed air pipe, referred to as the brake pipe, which runs continuously through the entire train. The brake pipe must be supplied with compressed air from the locomotive main supply reservoirs to release the train brakes and to operate the braking system. The air brake system allows the user to control the flow of compressed air into and out of the brake pipe to apply and release the train brakes. When an operator is charging the brake pipe with compressed air from the supply reservoir, the operator is provided an indication of the volumetric air flow. Because the air flow decreases as the brake pipe approaches target pressure, the air flow indication provides information about the degree to which the brake pipe has reached the desired target pressure throughout the train.

Various laws and regulations detail the maximum amount of air flow that can be present before a stopped train can be allowed to proceed in operation. Compliance with these and other laws and regulations requires the periodic calibration of the flow measuring system to insure that the operator is acting on valid information. However, the conventional method for calibrating the locomotive air brake flow measuring system requires several manual steps. As each manual step represents a labor cost as well as a potential for operator error, there is a need in the art for an automated approach to flow calibration.

BRIEF SUMMARY OF THE INVENTION

The present invention comprises a system for automatically calibrating flow measurements in an air brake system having a flow measurement assembly for outputting a signal representing volumetric air flow between a source of main reservoir pressure and the brake pipe pressure. A magnet valve selectively couples the brake pipe pressure to an exhaust via an orifice having a predetermined diameter. A controller coupled to the magnet valve is programmed to calibrate the signal of the flow measurement assembly based on volumetric air flow through the orifice when the magnet valve couples the source of brake pipe pressure to the exhaust. The system further comprises a brake pipe relay valve having an inlet connected to the source of main reservoir pressure and an outlet connected to the brake pipe pressure that is moveable to selectively couple brake pipe pressure to either the source of main reservoir pressure or to exhaust in order to match the pilot pressure supplied to the relay valve. The flow measurement assembly is positioned between the source of main reservoir pressure and the inlet of the brake pipe relay valve. An equalizing reservoir pilot pressure control assembly is coupled to a pilot of the brake pipe relay valve to control the relay valve. The controller is programmed to operate the equalizing reservoir pilot pressure control assembly to achieve a desired target pressure level. The equalizing reservoir pilot pressure is connected to the brake pipe relay valve, which connects the bkae pipe pressure to the source of main reservoir pressure or exhaust until the brake pipe pressure is equal to the equalizing reservoir pilot pressure. A human interface in communication with the controller is used to provide an operator of a train with a visual representation of the calibrated signal representing volumetric air flow. The controller may be further programmed to operate the equalizing reservoir pilot pressure control assembly to pilot the brake pipe relay valve so that brake pipe pressure is controlled to a desired target pressure for calibration in response to a command provided to the human interface.

The method of calibrating flow measurements in an air brake system of a train according to the present invention begins with activating a magnet valve to couple brake pipe pressure to an exhaust via an orifice having a predetermined diameter. The volumetric air flow between a source of main reservoir pressure and the brake pipe pressure is measured. The measurement is then based upon the volumetric air flow through the orifice after the brake pipe pressure is coupled to the exhaust by the magnet valve.

Preferably, the method includes the step of waiting for the pressure in the source of main reservoir pressure to equal to a predetermined amount before calibrating the measurement of volumetric air flow between the source of main reservoir pressure and the brake pipe pressure. Preferably, the method also includes the step of increasing the equalizing pilot pressure as necessary to achieve a predetermined amount of brake pipe pressure before calibrating the measurement of volumetric air flow between the source of main reservoir pressure and the brake pipe pressure. An operator of the train may then be notified that the measurement of volumetric air flow has been calibrated, or may be presented the option to save or discard the calibration. The step of measuring the volumetric air flow between the source of main reservoir pressure and the brake pipe pressure may be performed by piloting a brake pipe relay valve having an inlet connected to the source of main reservoir pressure and an outlet connected to brake pipe pressure to couple the source of main reservoir pressure to the brake pipe pressure through a flow measurement assembly. The step of calibrating the measurement of volumetric air flow between the source of main reservoir pressure and the brake pipe pressure based upon the volumetric air flow may be accomplished by calibrating a signal representing volumetric air flow provided by the flow measurement assembly according to volumetric air flow through the orifice when the pressure in the source of main reservoir pressure and the pressure in brake pipe are equal to the predetermined amounts. The step of piloting the brake pipe relay valve may involve operating an equalizing reservoir pilot pressure control assembly to pilot the brake pipe relay valve so that the brake pipe pressure achieves a predetermined target pressure while connected to the exhaust via the orifice. The method of the present invention is typically performed in response to a command input into an operator interface by an authorized operator.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
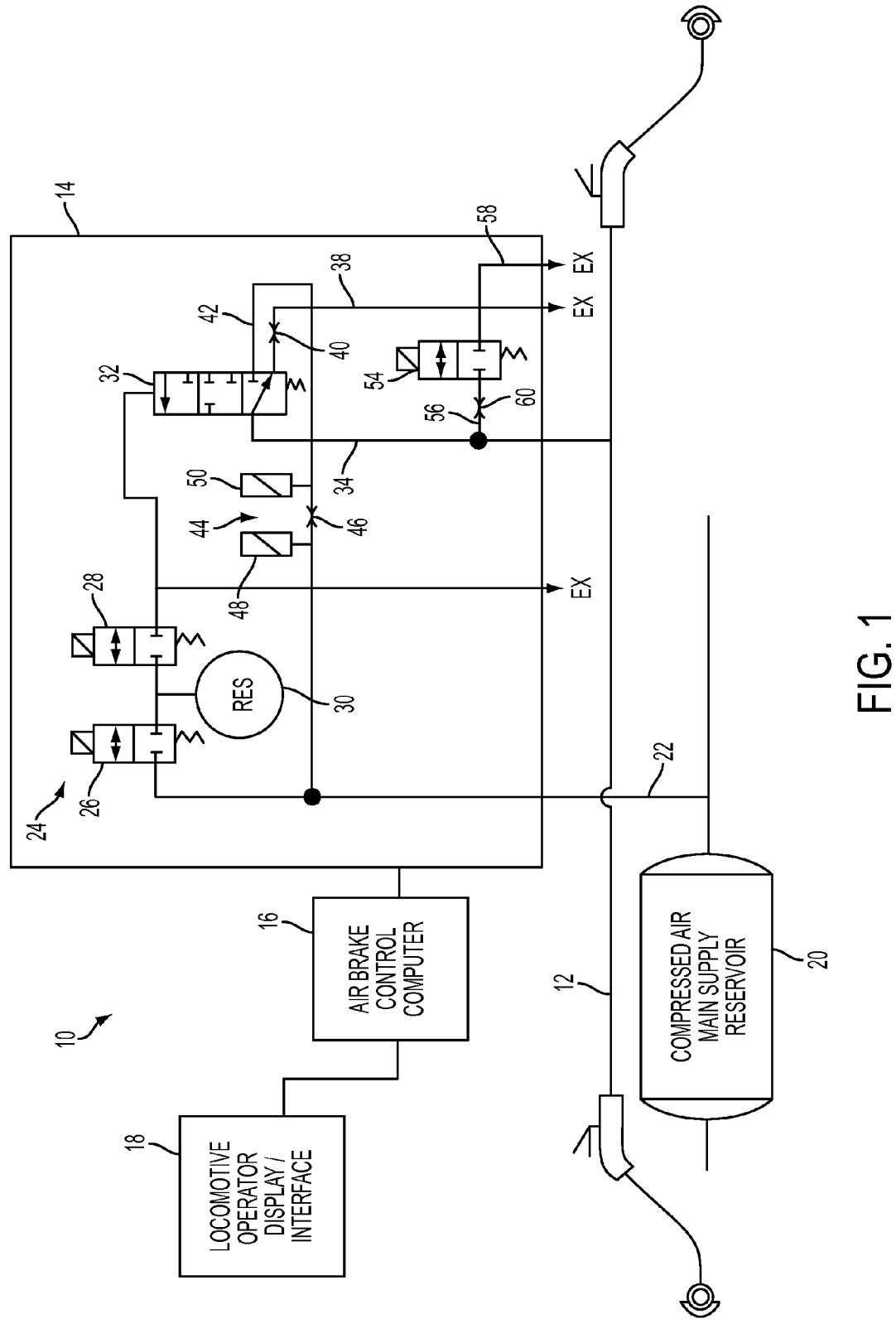
FIG. 1 is a schematic of an air brake system according to the present invention; and
}

Referring now to the drawings, wherein like reference numerals refer to like parts throughout, there is seen in FIG. 1 an air brake system 10 that can automatically calibrate air brake flow measurements. System 10 generally comprises a brake pipe 12 that extends the length of a train and is connected to a brake valve assembly 14 operated by an air brake control computer 16. Air brake control computer 16 is interconnected to a locomotive operator display/interface 18 to provides status information about air brake system 10 and to allow an operator to control the brakes of the train. For example, an operator commands a reduction of the pressure in brake pipe 12 using display/interface 18, thereby causing the brakes of the train to be applied.

Brake valve assembly 14 is interconnected to the compressed air main supply reservoir 20 via a supply line 22. Supply line 22 is in communication with an equalizing reservoir (ER) pilot pressure control assembly 24 having a pair of control valves 26 and 28 coupled to an equalizing reservoir 30. Changes in the pressure in equalizing reservoir 30 are used to pilot a BP (brake pipe) relay valve 32 that is coupled via a supply line 34 to brake pipe 12. BP relay valve 32 may be piloted by ER pilot pressure control assembly 24 between a first position where brake pipe 12 is connected to an output line 38 having a choke 40 that leads to exhaust EX, a second position where brake pipe 12 is isolated from exhaust EX, and a third position where brake pipe 12 is connected to and can be refilled from main supply reservoir 20 via a refill line 42 connected to supply line 22. The pressure level in the brake pipe is measured by pressure measurement device 62. Refill line 42 includes a flow measurement assembly 44 comprising a fixed diameter orifice 46 and a pair of pressure transducers 48 and 50 located on opposing sides of orifice 46. Assemblies 44, 24, 54, and 62 are in communication with control computer 16 to provide data from pressure transducers 48, 50, and 62. As a result, air brake control computer 16 can determine the flow rate through refill line 42 as well as the pressure in brake pipe 12 and provide an operator the required information about the degree to which brake pipe 12 has reached the desired target pressure.

Calibration of the flow measurement performed by flow measurement assembly 44 conventionally requires the physical addition of a dedicated, manually operated flow calibration orifice at one end of brake pipe 12. In order to automatically provide calibration, the present invention comprises a magnet valve 54 having an input line 56 coupled to supply line 34 and an output line 58 in communication with exhaust. A predetermined diameter orifice 60 is positioned in input line 56. Magnet valve 54 is moveable between a first position where brake pipe 12 is isolated from exhaust EX and a second position where brake pipe 12 is connected to exhaust EX. Operation of magnet valve 54 allows brake pipe 12 to be exhausted through orifice 60, thereby establishing a predetermined flow rate based on the predetermined size of orifice 60. BP relay valve 32 may be piloted by ER pilot pressure control assembly 24 to achieve a predetermined pressure target with brake pipe 12 being recharged by main supply reservoir 20 at the same rate that brake pipe is being exhausted through orifice 60. As the recharge rate of brake pipe 12 from main supply reservoir 20 should be nominally equal to the controlled exhaust flow rate through orifice 52, flow measurement assembly 44 can be calibrated against the known flow rate established by magnet valve 54 and orifice 60.

Figure 2:
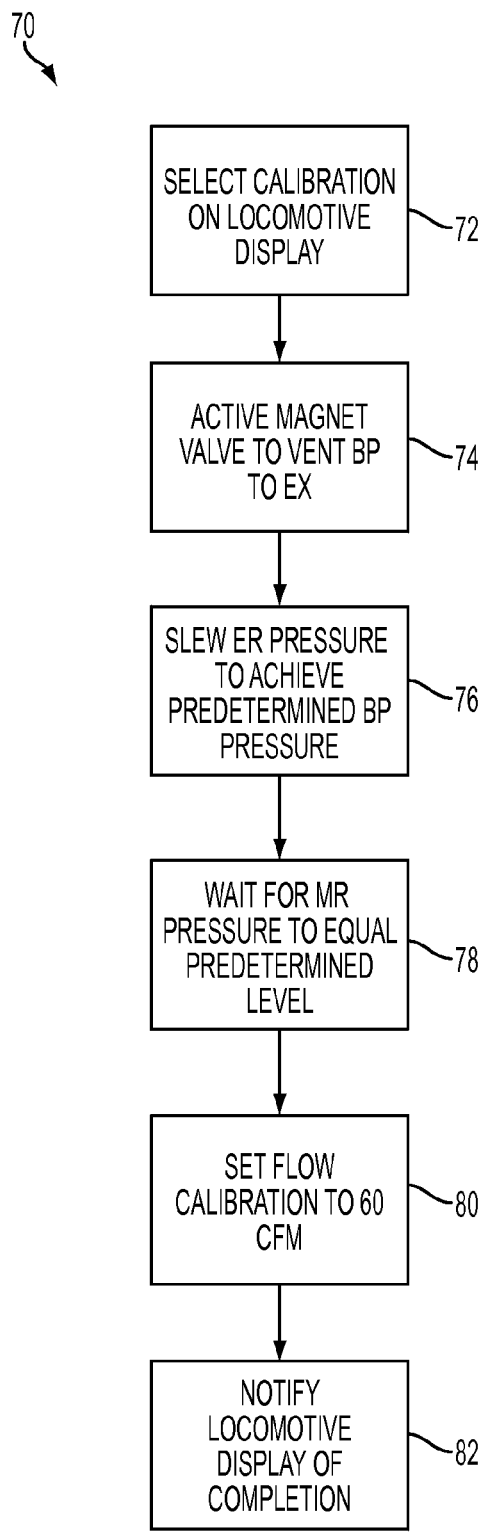
FIG. 2 is a schematic of a calibration process for an air brake system according to the present invention.

Referring to FIG. 2, air brake control computer 16 can perform a calibration process 70 that commences with a user selecting calibration 72 on the locomotive display 18. It should be understood by those in the art that, prior to selecting calibration process 72, display 18 could first require a user to navigate to a maintenance screen and/or enter identifying information, such as a user name and password, to limit access to calibration process 70. Once calibration has been selected at step 72, control computer 16 can activate magnet valve 54 to vent brake pipe 12 to atmosphere via exhaust EX 74. Next, control computer 16 can slew the pressure in equalizing reservoir 30 to achieve a desired amount of pressure in brake pipe 12, such as 90 psi 76. Once the pressure in main supply reservoir 20 equals a predetermined level 78, such as 130 psi, flow may be calibrated to the appropriate amount 80, which would be 60 cubic feet per minute using the exemplary numbers. Finally, a notification can be provided 82 that calibration process 70 is completed.

What is claimed is:

1. A system for automatically calibrating flow measurements in an air brake system comprising:
    a magnet valve for selectively coupling a source of brake pipe pressure to an exhaust via an orifice having a predetermined diameter;
    a flow measurement assembly for outputting a signal representing volumetric air flow between a source of main reservoir pressure and the brake pipe pressure; and
    a controller coupled to the magnet valve and programmed to calibrate the signal of the flow measurement assembly based on volumetric air flow through the orifice when the magnet valve couples the brake pipe pressure to the exhaust.

2. The system of claim 1, further comprising a brake pipe relay valve having an inlet connected to the main reservoir pressure and an outlet connected to the brake pipe pressure that is moveable to selectively couple the brake pipe pressure to the main reservoir pressure or to the exhaust until an equalizing reservoir pilot pressure is nominally matched.

3. The system of claim 2, wherein the flow measurement assembly is positioned between the main reservoir pressure and the inlet of the brake pipe relay valve.

4. The system of claim 3, further comprising an equalizing reservoir pilot pressure control assembly coupled to a pilot of the brake pipe relay valve.

5. The system of claim 4, wherein the controller is programmed to operate the equalizing reservoir pilot pressure control assembly to pilot the brake pipe relay valve so that a predetermined level of brake pipe pressure is achieved.

6. The system of claim 5, further comprising a human interface in communication with the controller for providing an operator of a train with a visual representation of the calibrated signal representing volumetric air flow.

7. The system of claim 6, wherein the controller is further programmed to operate the equalizing reservoir pilot pressure control assembly to pilot the brake pipe relay valve so that a predetermined level of brake pipe pressure is achieved in response to a command provided to the human interface.

8. A method of calibrating flow measurements in an air brake system of a train, comprising the steps of:

activating a magnet valve to couple a source of brake pipe pressure to an exhaust via an orifice having a predetermined diameter;

measuring the volumetric air flow between a source of main reservoir pressure and the brake pipe pressure using a flow measurement assembly that outputs a signal representative of the volumetric air flow; and calibrating the measurement of volumetric air flow between the main reservoir pressure and the brake pipe pressure by the flow measurement assembly based upon the volumetric air flow through the orifice after the brake pipe pressure is coupled to the exhaust by the magnet valve with a controller programmed to compare the measurement of volumetric air flow between the main reservoir pressure and the brake pipe pressure with the volumetric air flow through the orifice after the brake pipe pressure is coupled to the exhaust.

9. The method of claim 8, further comprising the step of waiting for the pressure in the main reservoir pressure to be equal to a predetermined amount before calibrating the measurement of volumetric air flow between the main reservoir pressure and the brake pipe pressure.

10. The method of claim 9, further comprising the step of controlling the equalizing pilot pressure to achieve a predetermined amount of brake pipe pressure before calibrating the measurement of volumetric air flow between the main reservoir pressure and the brake pipe pressure.

11. The method of claim 10, further comprising the step of notifying an operator of the train that the measurement of volumetric air flow has been calibrated.

12. The method of claim 11, wherein the step of measuring the volumetric air flow between the source of main reservoir pressure and the brake pipe pressure comprises the steps of piloting a brake pipe relay valve having an inlet connected to the source of main reservoir pressure and an outlet connected to the brake pipe pressure to couple the source of main reservoir pressure to the brake pipe pressure through a flow measurement assembly.

13. The method of claim 12, wherein the step of calibrating the measurement of volumetric air flow between the source of main reservoir pressure and the source of brake pipe pressure based upon the volumetric air flow comprising calibrating a signal representing volumetric air flow provided by the flow measurement assembly according to volumetric air flow through the orifice when the pressure in the source of main reservoir pressure is equal to the predetermined amount.

14. The method of claim 13, wherein the step of piloting the brake pipe relay valve comprises the step of operating an equalizing reservoir pilot pressure control assembly to a target pressure as necessary to achieve a predetermined level of brake pipe pressure based on the measured amount of brake pipe pressure.

15. The method of claim 14, wherein the step of operating the equalizing reservoir pilot pressure to achieve a predetermined brake pipe pressure is performed in response to a command input into an operator interface.

* * * * *